United States Patent
Toledano et al.

[19]

[11] Patent Number: 5,923,248
[45] Date of Patent: Jul. 13, 1999

[54] ALARM PHONE

[76] Inventors: Enrique C. Toledano; Castor Debera, both of 74 W. 11th St., Mialeah, Fla. 33010

[21] Appl. No.: 09/063,345

[22] PCT Filed: May 1, 1997

[86] PCT No.: PCT/US97/07755

§ 371 Date: Apr. 21, 1998

§ 102(e) Date: Apr. 21, 1998

[87] PCT Pub. No.: WO98/10388

PCT Pub. Date: Mar. 12, 1998

Related U.S. Application Data

[60] Provisional application No. 60/025,392, Sep. 4, 1996.

[51] Int. Cl.[6] .................................................. G08B 13/00
[52] U.S. Cl. ...................... 340/541; 340/691.7; 379/44; 379/48
[58] Field of Search ................................. 340/541, 545.1, 340/550, 551, 552, 561, 565, 691.7, 545.2; 341/20, 22, 35, 192; 379/48, 40, 44

[56] References Cited

U.S. PATENT DOCUMENTS

| | | | |
|---|---|---|---|
| 3,072,746 | 1/1963 | Zimmermann | 379/51 |
| 3,369,079 | 1/1968 | Glidden | 379/40 |
| 3,390,234 | 6/1968 | Glidden | 340/540 |
| 3,594,508 | 7/1971 | Glidden | 379/40 |
| 4,145,581 | 3/1979 | Stockdale | 379/40 |
| 5,440,292 | 8/1995 | Bedrosian | 340/567 |
| 5,457,730 | 10/1995 | Rounds | 379/40 |
| 5,463,595 | 10/1995 | Rodhall et al. | 340/573.1 |

*Primary Examiner*—Daniel J. Wu
*Attorney, Agent, or Firm*—Richard C. Litman

[57] ABSTRACT

An alarm phone for dialing a predetermined phone number to deliver a predetermined code upon activation by a detection event. The alarm phone includes a motion detector which, when activated, activates a motor by completing a circuit from a battery through the motion detector to the motor. The motor rotates a cam disk having a cam surface which actuates cam levels. As the motor continues to rotate the cam disk, the cam surface actuates other cam levels which contact surface plates and complete connections which respectively pick up the switch hook of a telephone.

10 Claims, 3 Drawing Sheets

ALARM PHONE

CROSS REFERENCE TO RELATED APPLICATIONS

This application claims the benefit of U.S. Provisional Application Ser. No. 60/025,392 filed Sep. 4, 1996.

BACKGROUND OF THE INVENTION

1. Field of the Invention

The present invention relates to a motion detector that actuates a telephone.

2. Description of the Prior Art

State of the art home security systems require a significant, costly and time consuming installation process in order to adequately secure the home against intruders. Such security systems monitor the perimeter of the house for a breach in the system, as well as monitor the interior of the house for any motion, smoke and/or fire. Such home security systems typically require additional service costs for monitoring of alarms by a service company. One problem with such systems is that once they are installed in the house, they remain affixed thereto. In the event a person moves into another dwelling, such systems cannot be relocated.

Therefore, it is desirable to provide a security system which offers some degree of security against unwanted intruders and/or fire, yet also is freely portable by its owner. Such a device is especially desirable for persons who dwell in apartment buildings which are not equipped with state of the art security systems that regulate entry to the apartment building.

The related art contains a number of devices which teach the use of alarm phones capable of dialing a predetermined phone number in response to a triggering event. The following art disclose various telephone alarm devices: U.S. Pat. No. 647,307, issued on Apr. 10, 1900 to J. M. Latimer; U.S. Pat. No. 669,792, issued on Mar. 12, 1901 to A. S. Hibbard; and U.S. Pat. No. 2,088,002, issued on Jul. 27, 1937 to H. D. Scott.

Of particular interest is U.S. Pat. No. 3,594,508, issued on Jul. 20, 1971 to Roger C. Glidden, which discloses a data reporting system that utilizes a motor-driven code wheel which programs the supply of electrical energy from telephone lines to the code wheel-driving motor through a switching device to intermittently load the telephone lines with dialing pulses. The code wheel relies upon a plurality of camming surfaces thereon for effecting contact members that open and close circuitry in response to code wheel rotation.

U.S. Pat. No. 3,937,891, issued on Feb. 10, 1976 to George K. Roeder, discloses a burglar alarm which utilizes a motor-driven cam device to physically depress a call button present on a telephone, thereby initiating a telephone call.

An informational brochure by TelAlert of Calgery, Alberta (Canada) discloses a security alarm telephone capable of dialing up to nine pre-set telephone numbers in response to a signal from one of a variety of detectors. Another informational brochure discloses a telephone alarm dialing system (DICON 9000), which dials several preset telephone numbers and plays a computer synthesized voice message in response to a signal from a detector.

Other alarm devices which activate telephone dialing operations include: U.S. Pat. No. 5,278,888, issued on Jan. 11, 1994 to Matti Myllymaki; and U.S. Pat. No. 5,388,144, issued on Feb. 7, 1995 to John D. Nichols. This concept also is taught by French Patent No. 927,845, issued on Nov. 11, 1947, Great Britain Patent Nos. 1,594,204, issued on Jul. 30, 1981, and 2,049,353, issued on Dec. 17, 1980, and PCT Patent Application Publication No. WO 89/03627, published on Apr. 20, 1989. Alarm-actuated telephone dialers are taught in the article *Build an Emergency Telephone Dialer* at page 38 of the September, 1992 issue of *Popular Electronics* and the advertisement entitled *Protection On-Line* at page 14 of the September, 1993 issue of the DAK catalog. U.S. Pat. No. 2,804,501, issued on Aug. 27, 1957 to V. B. Hart, teaches a voice warning system, and U.S. Pat. Nos. 2,806, 902, issued on Sep. 17, 1957 to J. P. Gutierrez, and 3,072, 746, issued on Jan. 8, 1963 to J. J. Zimmermann, teach automatic redial and telephone dialing apparatus.

However, none of the above inventions and disclosures describes an alarm telephone which utilizes a cam and delay circuitry to effect automated dialing as does the device according to the instant invention. None of the above inventions and patents, taken either singly or in combination, is seen to describe the instant invention as claimed.

SUMMARY OF THE INVENTION

The instant invention includes a detector (i.e., motion detector) which, when actuated, activates a motor by completing a circuit from a battery through the motion detector to the motor. The motor rotates a cam disk having a cam surface which actuates various cam levers. These levers, of which there are four, make electrical contact with contact surfaces and cause the alarm-phone to perform various functions. The first lever, a motor switch lever, completes the circuit to connect one of the leads from the battery to the motor (the other lead from the battery is permanently connected). This circuit completed by the motor switch is in parallel to the circuit completed by the motion detector, i.e. only one needs to be completed to operate the motor. When the motion detector has ceased and the circuit through it is open, no power will flow through it from the battery to the motor. However, by the time the motion detector switch is open, the motor switch has been activated and delivers power to the motor. Delay circuitry, that is in series with the motion detector circuit, is included that allows for exit without the motion detector activating the motor. Upon entry, the system is deactivated, preferably with a key or a code. As the motor continues to rotate the cam disk, the cam surface actuates a second cam lever, a third cam lever, and a fourth cam lever, which contact surface plates and complete connections which respectively pick up the switch hook of a telephone, redial the telephone, and enter a signal. Optionally, the unit can include a recorder that is activated by the fourth cam lever or another so that the telephone warning will include a voice message to indicate an intruder (i.e., "someone is breaking into your house") or other threatening event.

Accordingly, it is a principal object of the invention to provide an alarm that is economical and portable.

It is another object of the invention to provide an alarm system that includes its own power source and utilizes that of the telephone jack into which it plugs.

It is a further object of the invention to provide an alarm that requires very little effort to install.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
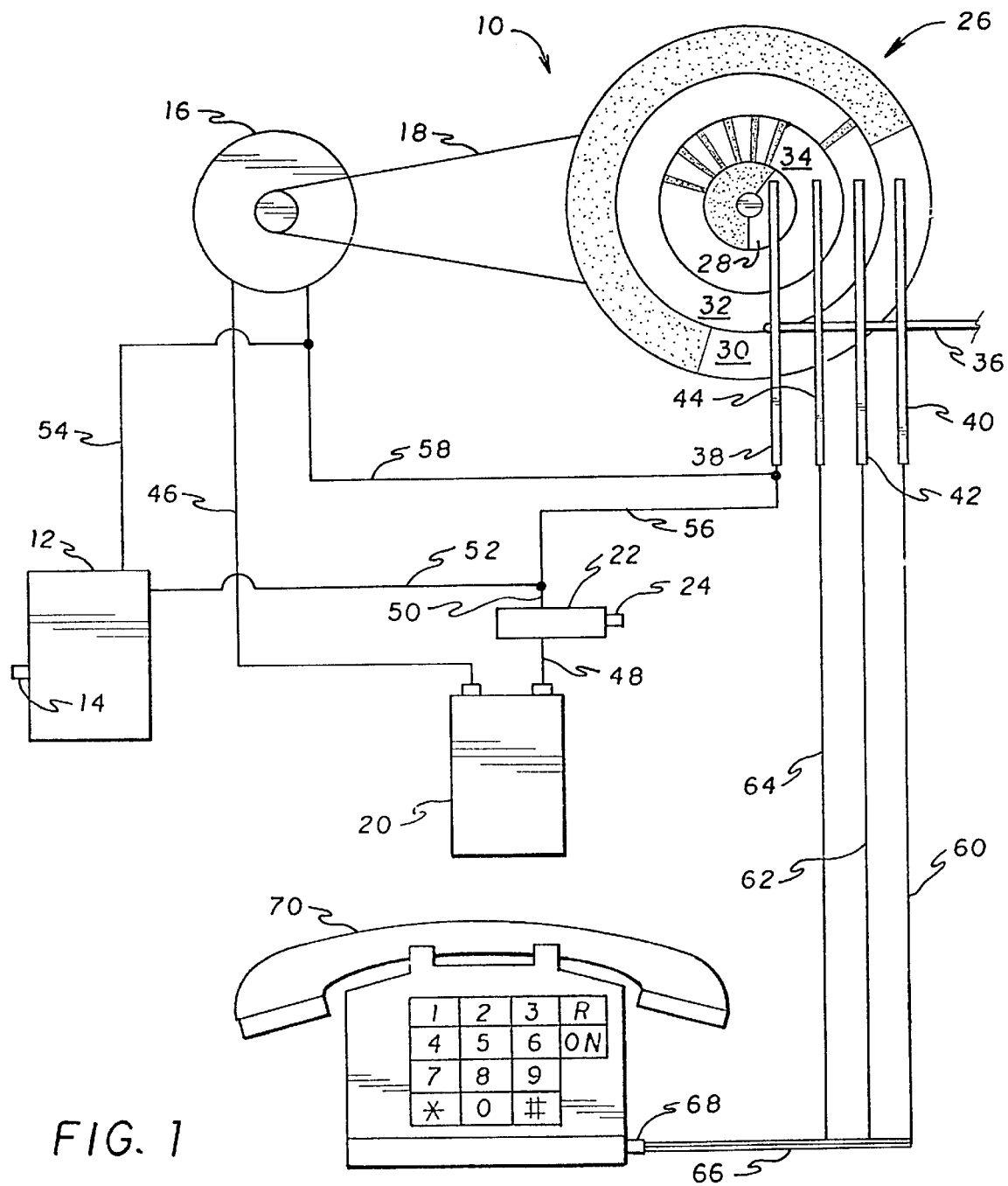
FIG. 1 is a schematic diagram of the telephone-alarm.
Figure 2:
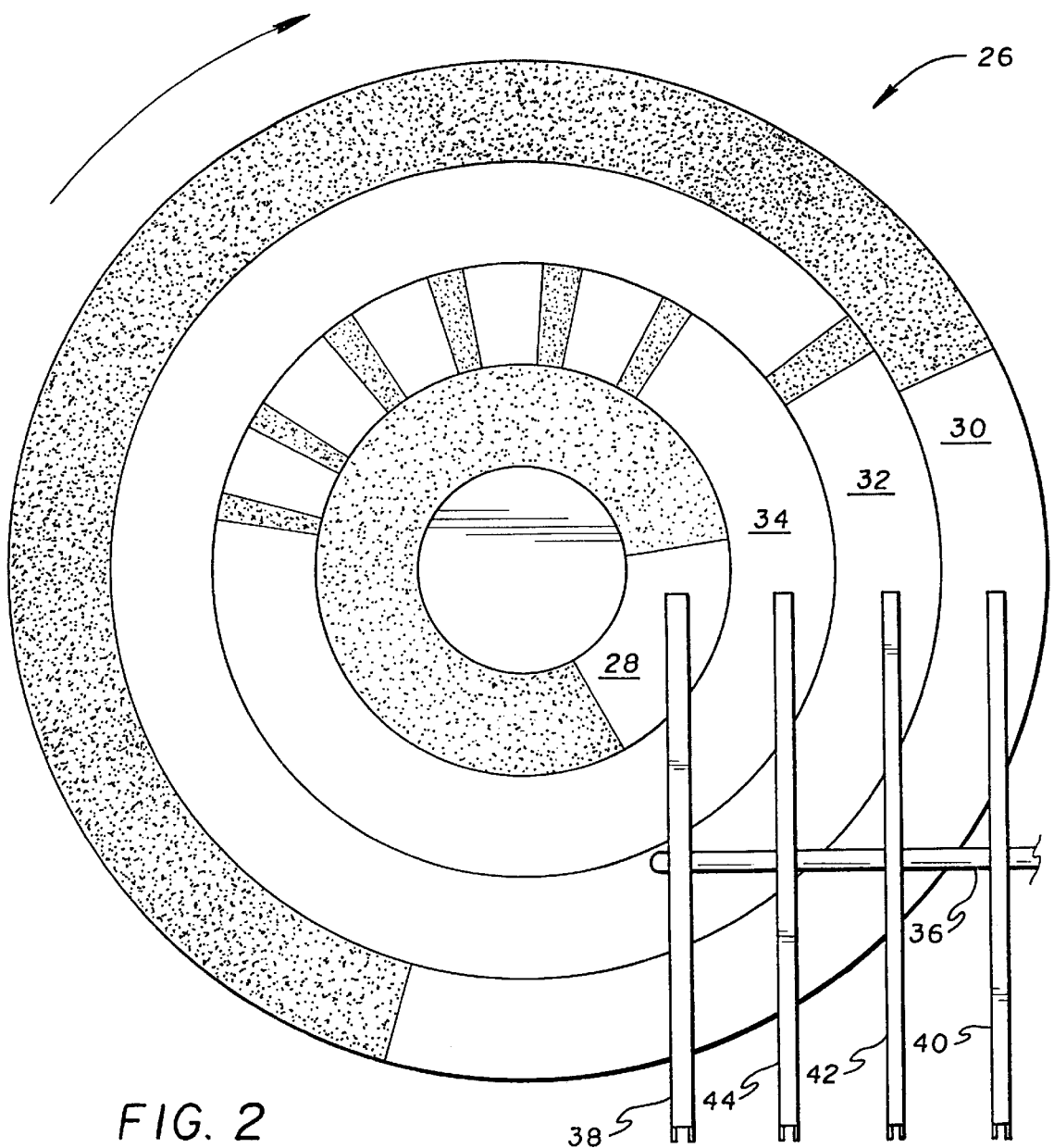
FIG. 2 is an enlarged view of the cam disk.

FIG. 1 is a schematic diagram of the alarm-telephone 10. The unit includes a motion or other detector 12 (i.e., fire, smoke, flood, etc.) having a sensitivity control 14, a motor 16 which operates a belt 18, a cam disk 26 operated by the belt 18, and a battery 20. The unit may also include a telephone 70 with a keypad operated by cam levers 40, 42, and 44 (described in more detail below). Alternatively, the system may not include a telephone and merely be adapted for plugging into the receptacle 68 of a telephone. Regardless of its form, the alarm-telephone telephone 10 will preferably be provided with a housing (not shown) which contains all of the components thereof.

Operation of the motor 16 and thus the alarm 10 occurs when connections between the battery 20 and the motor 16 are completed by the closing of circuits. One pole of the battery 20 is permanently and directly attached to the motor 16 by wire 46. The other pole is indirectly attached to the motor 16 and current flows only when (1) the motion detector circuit in the motion detector 12 is closed, or (2) the motor switch circuit, which is controlled by the motor switch cam lever 38, is closed.

When the motion detector 12 is activated, i.e. by movement of an intruder, the circuit inside of it closes, allowing current to flow from the battery 20, through wires 48, 50, and 52, through the motion detector circuit, and through wire 54 to the motor 16. Along this path there is a delay circuit 22, which has a manual control 24, to allow for the user's exiting after activating the alarm 10. The motor 16 operates the belt 18 which causes the cam disk 26 to rotate in a clockwise direction.

Figure 3:
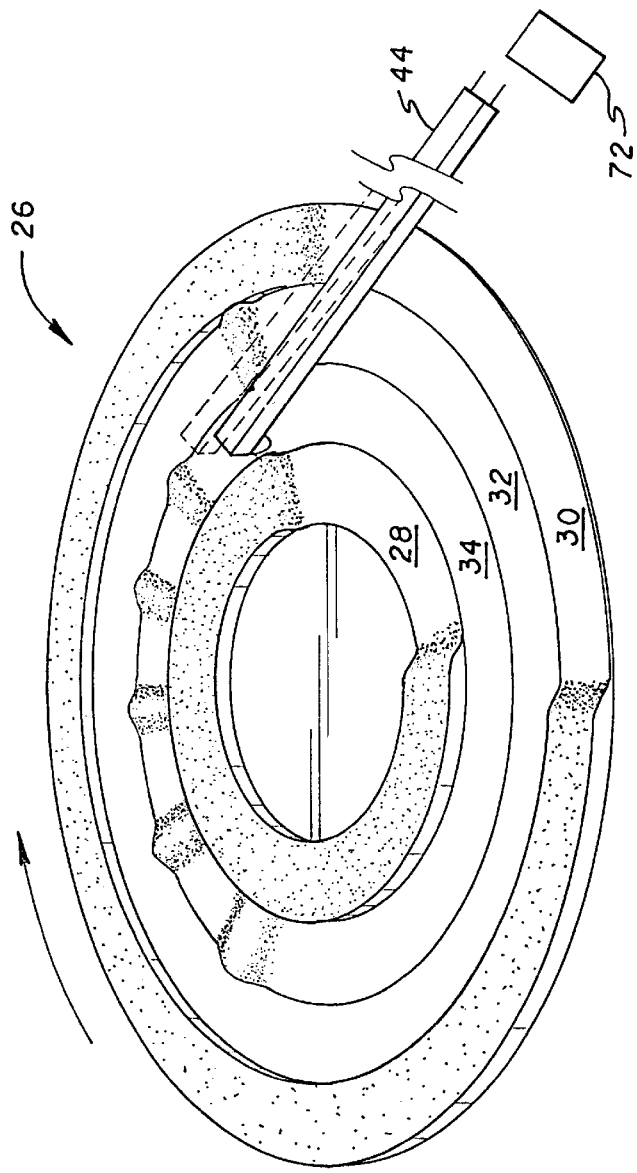
FIG. 3 is a perspective view of the cam disk showing its operation of a cam lever.

The raised surfaces on the cam disk 26 operate the cam levers 38, 40, 42, and 44. The cam levers are pivoted (as seen in FIG. 3) to contact a plate 72 to which multiple wires are connected and complete a circuit. With reference again to FIG. 1, the rotation of the cam disk 26 brings the surface in the inner ring 28 into contact with the motor switch cam lever 38. The motor switch cam lever 38 is forced in an upwards direction and pivots about fulcrum 36, causing the lever to swing downwardly and until it contact plate 72. Thus, the motor switch circuit is completed and current runs from the battery 20 through wires 48, 50, 56, and 58 to the motor 16. The motor switch and the motion detector switch are in parallel, i.e. current will flow from the battery 20 to the motor 16 if either one of these switches is closed. This is an important feature of the invention because the motion detector switch will open shortly after the motion ceases. By constructing the cam disk 26 to close the motor switch with cam lever 38, complete rotation of the cam disk 26 is guaranteed.

As the cam disk 26 continues to rotate, it will then activate certain functions of a telephone 70. Next the cam surface of the outer ring 30 of the cam disk 26 will contact cam lever 40, causing it to contact plate 72 and energize wire 60. This activates the switchhook of the telephone 70, i.e. turn on the telephone. Ring 32 of the cam disk 26 will then contact cam lever 42, causing it to contact plate 72. This results in the flow of current through wire 62, causing the telephone to redial the last number. Because the cam surface in ring 32 is narrow, the circuit will be closed only long enough for the redial button (which has been programmed by the user) to be actuated. Finally, the cam surface in ring 34 will cause cam lever 44 to contact plate 72 and energize wire 64. Because of the configuration of the cam surface, lever 44 will intermittently contact the wire 64 and cause the telephone to dial a code. As the cam disk 26 nears a complete cycle of rotation, the inner ring 28 will deactivate the motor switch cam lever 38 (when it reaches the end of the profile) and deactivate the motor 16. This causes rotation of the cam disk 26 to cease.

To disable the device upon entry into the house by the owner or other allowed guest, the user simply enters a code or uses a key to deactivate the system. Such a code or key may simply open a switch (not shown) present along the electrical wire 46, thereby opening the circuit between the battery 20 and the motor 16.

Figure 4:
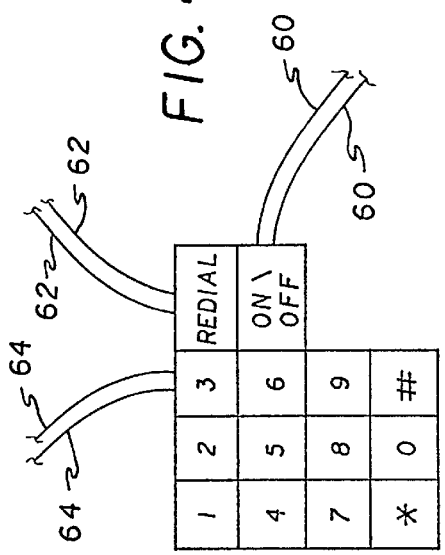
FIG. 4 is a view representative of the connections to the telephone keypad.

The wires 60, 62, and 64 are either connected into one wire 66 and attached to the telephone receptacle 68 as shown in FIG. 1, or they are attached directly to the keypad of a telephone as shown in FIG. 4. In the latter case, the telephone must be wired as shown in FIG. 4 and the telephone is part of the unit.

The unit can optionally include a tape recorder so that a voice warning, rather than the code, can be given to indicate activation of the motion detector.

It is to be understood that the present invention is not limited to the embodiments described above., but encompasses any and all embodiments within the scope of the following claims.

We claim:

1. An alarm system comprising:
   a telephone keypad;
   a motion detector having a sensitivity control and a motion detector circuit;
   a battery having two poles;
   a motor;
   a motor switch circuit; and
   a cam disk having a cam profile and a plurality of cam levers controlled by said cam profile, one of said plurality of cam levers controlling said motor switch circuit, the other of said plurality cam levers controlling said telephone keypad;
   wherein one of said poles of said battery being in direct electrical connection with said motor, the other of said poles being in indirect contact with said motor, said indirect contact including an electrical path through said motor switch circuit and an electrical path through said motion detector circuit, such that when one of said motion detector circuit and said motor switch circuit is closed, electricity flows from said battery to said motor.

2. The alarm of claim 1 further comprising a delay circuit in said electrical path through said motion detector circuit.

3. The alarm of claim 1 wherein said other cam levers comprise:
   a second lever connected to said telephone keypad for initiating a dial tone;
   a third cam lever connected to said telephone keypad for intiating a redial function to dial a predetermined telephone number; and a fourth cam lever connected to said telephone keypad for intiating production of a code.

4. The alarm of claim 1 wherein said code comprises a predetermined pattern of tones.

5. An alarm comprising:

a motion detector having a motion detector circuit;

a battery having two poles;

a motor;

a motor switch circuit; and a cam disk having a cam profile and a plurality of cam levers controlled by said cam profile, one of said cam levers controlling said motor switch circuit, the other of said cam levers controlling various operations on a telephone keypad;

one of said poles of said battery in direct electrical connection with said motor, the other of said poles in indirect contact with said motor, said indirect contact including an electrical path through said motor switch circuit and an electrical path through said motion detector circuit, such that when one of said motion detector circuit and said motor switch circuit is closed, electricity flows from said battery to said motor.

6. The alarm of claim 5 further wherein said motion detector further comprises a sensitivity control.

7. In combination with a telephone having a keypad, an alarm comprising:

a motion detector having a motion detector circuit;

a battery having two poles;

a motor;

a motor switch circuit; and a cam disk having a cam profile and a plurality of cam levers controlled by said cam profile, one of said cam levers controlling said motor switch circuit, the other of said cam levers controlling said telephone keypad;

said battery supplying power to said motor when one of said motion detector circuit and said motor switch circuit is closed.

8. The alarm of claim 7 further comprising wires for the electrical connection of said other cam levers to said telephone keypad.

9. The alarm of claim 8 wherein said telephone has a receptacle and said wires include a single wire which connects into said receptacle.

10. The alarm of claim 8 wherein said wires are connected directly to said keypad.

* * * * *